United States Patent
Parks et al.

(10) Patent No.: US 9,759,368 B1
(45) Date of Patent: Sep. 12, 2017

(54) MULTIPURPOSE LIGHTING AND ENTERTAINMENT STAND

(71) Applicants: Terry Parks, Washington, DC (US); Esther Parks, Washington, DC (US)

(72) Inventors: Terry Parks, Washington, DC (US); Esther Parks, Washington, DC (US)

(*) Notice: Subject to any disclaimer, the term of this patent is extended or adjusted under 35 U.S.C. 154(b) by 0 days.

(21) Appl. No.: 15/292,904

(22) Filed: Oct. 13, 2016

(51) Int. Cl.
| | |
|---|---|
| F21L 19/00 | (2006.01) |
| F21S 8/00 | (2006.01) |
| F21S 4/00 | (2016.01) |
| F21V 21/00 | (2006.01) |
| F16M 11/32 | (2006.01) |
| A47G 29/10 | (2006.01) |
| A47B 13/16 | (2006.01) |
| B65F 1/00 | (2006.01) |
| F21V 23/00 | (2015.01) |
| F21V 33/00 | (2006.01) |
| F21Y 115/10 | (2016.01) |

(52) U.S. Cl.
CPC ............. *F16M 11/32* (2013.01); *A47B 13/16* (2013.01); *A47G 29/10* (2013.01); *B65F 1/00* (2013.01); *F21V 23/001* (2013.01); *F21V 33/0012* (2013.01); *A47B 2200/008* (2013.01); *F16M 2200/028* (2013.01); *F21Y 2115/10* (2016.08)

(58) Field of Classification Search
CPC .. F16M 11/32; F16M 2200/028; A47G 29/10; A47B 13/16; A47B 2200/008; B65F 1/00; F21V 33/0012; F21V 23/001; F21Y 2115/10

See application file for complete search history.

(56) References Cited

U.S. PATENT DOCUMENTS

| | | | | |
|---|---|---|---|---|
| 4,936,594 A | * | 6/1990 | Oliver, III | A47B 81/06 280/47.19 |
| 5,419,263 A | | 5/1995 | Mills | |
| 8,201,794 B1 | | 6/2012 | Pesola | |
| 9,089,234 B2 | * | 7/2015 | Webb | A47G 23/02 |
| 2003/0227854 A1 | * | 12/2003 | Weaver | G11B 33/0455 720/600 |
| 2006/0119233 A1 | * | 6/2006 | Thomas | A47B 21/00 312/235.9 |
| 2011/0247528 A1 | * | 10/2011 | Walker | A63F 13/02 108/42 |

* cited by examiner

*Primary Examiner* — Donald Raleigh
(74) *Attorney, Agent, or Firm* — Stevenson IP, LLC

(57) ABSTRACT

A multipurpose lighting and entertainment stand including a base unit and each of a plurality of vertically disposed telescopic legs and a trash can attached to the base unit. A horizontally disposed platform is disposed directly atop the plurality of vertically disposed telescopic legs. Each of a right opening and a left opening of a pair of circular cup holder openings is disposed through the horizontally disposed platform. A pair of attached identical triangular compartments is disposed on and extended rearward from a rear edge of the horizontally disposed platform. Each of a right hook and a left hook of a pair of hooks is attached to an external surface of the pair of attached identical triangular compartments. A lighting unit having a plurality of upward facing light emitting diodes is disposed on an upper ledge of the pair of attached identical triangular compartments.

2 Claims, 6 Drawing Sheets

MULTIPURPOSE LIGHTING AND ENTERTAINMENT STAND

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of lighting stands are known in the prior art. However, what has been needed is a multipurpose lighting and entertainment stand including a base unit, a plurality of vertically disposed telescopic legs attached to the base unit, and a trash can attached to the base unit. What has been further needed is a horizontally disposed platform disposed directly atop the plurality of vertically disposed telescopic legs, each of a right opening and a left opening of a pair of circular cup holder openings disposed through the horizontally disposed platform, a pair of attached identical triangular compartments disposed on and extended rearward from a rear edge of the horizontally disposed platform, and each of a right hook and a left hook of a pair of hooks attached to an external surface of the pair of attached identical triangular compartments. Lastly, what has been needed is a lighting unit having a plurality of upward facing light emitting diodes disposed on an upper ledge of the pair of attached identical triangular compartments. The multipurpose lighting and entertainment stand is different from other entertainment stands in that its unique structure provides a user with a light source, a power source, and a convenient storage space for commonly used goods including, but not limited to, charging devices, remote controls, beverages, and keys.

FIELD OF THE INVENTION

The present invention relates to lighting stands, and more particularly, to a multipurpose lighting and entertainment stand.

SUMMARY OF THE INVENTION

The general purpose of the present multipurpose lighting and entertainment stand, described subsequently in greater detail, is to provide a multipurpose lighting and entertainment stand which has many novel features that result in a multipurpose lighting and entertainment stand which is not anticipated, rendered obvious, suggested, or even implied by prior art, either alone or in combination thereof.

To accomplish this, the present multipurpose lighting and entertainment stand includes a base unit having a top side, a bottom side, a front side, a rear side, a right side, and a left side. A plurality of vertically disposed cylindrical telescopic legs includes a front right leg, a front left leg, and a rear middle leg, with each of the front right leg, the front left leg, and the rear middle leg disposed on the top side of the base unit. Specifically, each of the front right leg and the front left leg is medially disposed on the top side of the base unit between the front side and the rear side, and the rear middle leg is medially disposed between the front right leg and the front left leg proximal the rear side. A trash can, optionally rectangular, is attached to the top side of the base unit proximal the left side. The trash can has an open top end.

The multipurpose lighting and entertainment stand further includes a horizontally disposed rectangular platform medially disposed directly atop the plurality of vertically disposed cylindrical telescopic legs. The rectangular platform has a front edge, a rear edge, a right edge, a left edge, a right front corner, a left front corner, a right rear corner, a left rear corner, a top surface, and a bottom surface. Each of a right support end and a left support end of a pair of vertically disposed L-shaped support ends is disposed directly atop each the right rear corner and the left rear corner, respectively, of the horizontally disposed rectangular platform, along a continuous outer edge of the horizontally disposed rectangular platform. Each of a right opening and a left opening of a pair of circular cup holder openings is disposed through the horizontally disposed rectangular platform proximal each of the right edge and the left edge, respectively.

A pair of attached identical triangular compartments is medially disposed on and extended rearward from the rear edge of the horizontally disposed rectangular platform. The pair of attached identical triangular compartments has a vertically disposed substantially triangular right wall, a vertically disposed substantially triangular left wall, a vertically disposed rear wall disposed between the substantially triangular right wall and the substantially triangular left wall, a horizontally disposed bottom wall, a vertically disposed middle divider wall medially disposed between the substantially triangular right wall and the substantially triangular left wall, and an upper ledge. Each of a right aperture and a left aperture of a pair of circular apertures is disposed within the vertically disposed rear wall of the pair of attached identical triangular compartments proximal each of the vertically disposed substantially triangular right wall and the vertically disposed substantially triangular left wall, respectively. Each of a right hook and a left hook of a pair of hooks is attached to an external surface of each of the vertically disposed substantially triangular right wall and the vertically disposed substantially triangular left wall, respectively, of the pair of attached identical triangular compartments.

A rectangular lighting unit is disposed on the upper ledge of the pair of attached identical triangular compartments. The rectangular lighting unit has an exterior housing, a plurality of upward facing light emitting diodes, and an activation control. A power outlet is disposed on the vertically disposed substantially triangular left wall of the pair of attached identical triangular compartments. A power cord has a proximal end attached to the power outlet and a distal end extended downward through one of the plurality of vertically disposed cylindrical telescopic legs and removably attachable to a power source. The plurality of upward facing light emitting diodes of the rectangular lighting unit, the activation control of the rectangular lighting unit, the power outlet, and the power source are in operational communication with each other.

Lastly, the multipurpose lighting and entertainment stand includes a pair of disc-shaped cup holders including a right cup holder and a left cup holder. Each of the right cup holder and the left cup holder is attached to each of the front right leg and the front left leg, respectively, of the plurality of vertically disposed cylindrical telescopic legs. Each of the right cup holder and the left cup holder is disposed underneath each of the right opening and the left opening, respectively, of the pair of circular cup holder openings. A disc-shaped circular speaker holder is attached to the rear middle leg of the plurality of vertically disposed cylindrical telescopic legs. The disc-shaped circular speaker holder is forwardly extended between each of the front right leg and the front left leg of the plurality of vertically disposed cylindrical telescopic legs.

The multipurpose lighting and entertainment stand thus provides a uniquely structured piece of furniture that allows a user to quickly and efficiently store and retrieve personal items including, but not limited to, beverages and keys. The multipurpose lighting and entertainment stand is also specifically structured to provide a source of power and lighting to the user as well.

Thus has been broadly outlined the more important features of the present multipurpose lighting and entertainment stand so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
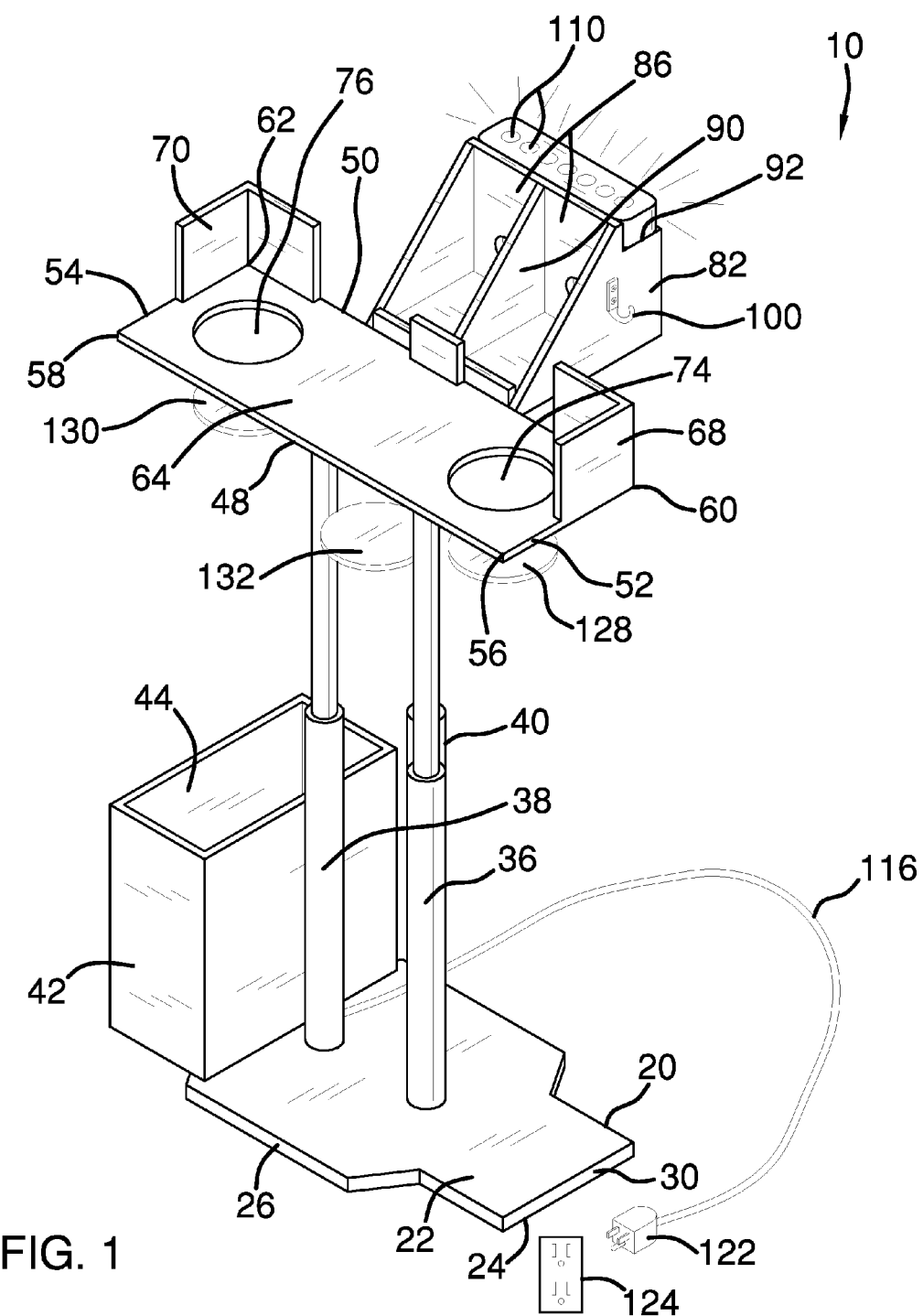
FIG. 1 is a front isometric view.
Figure 2:
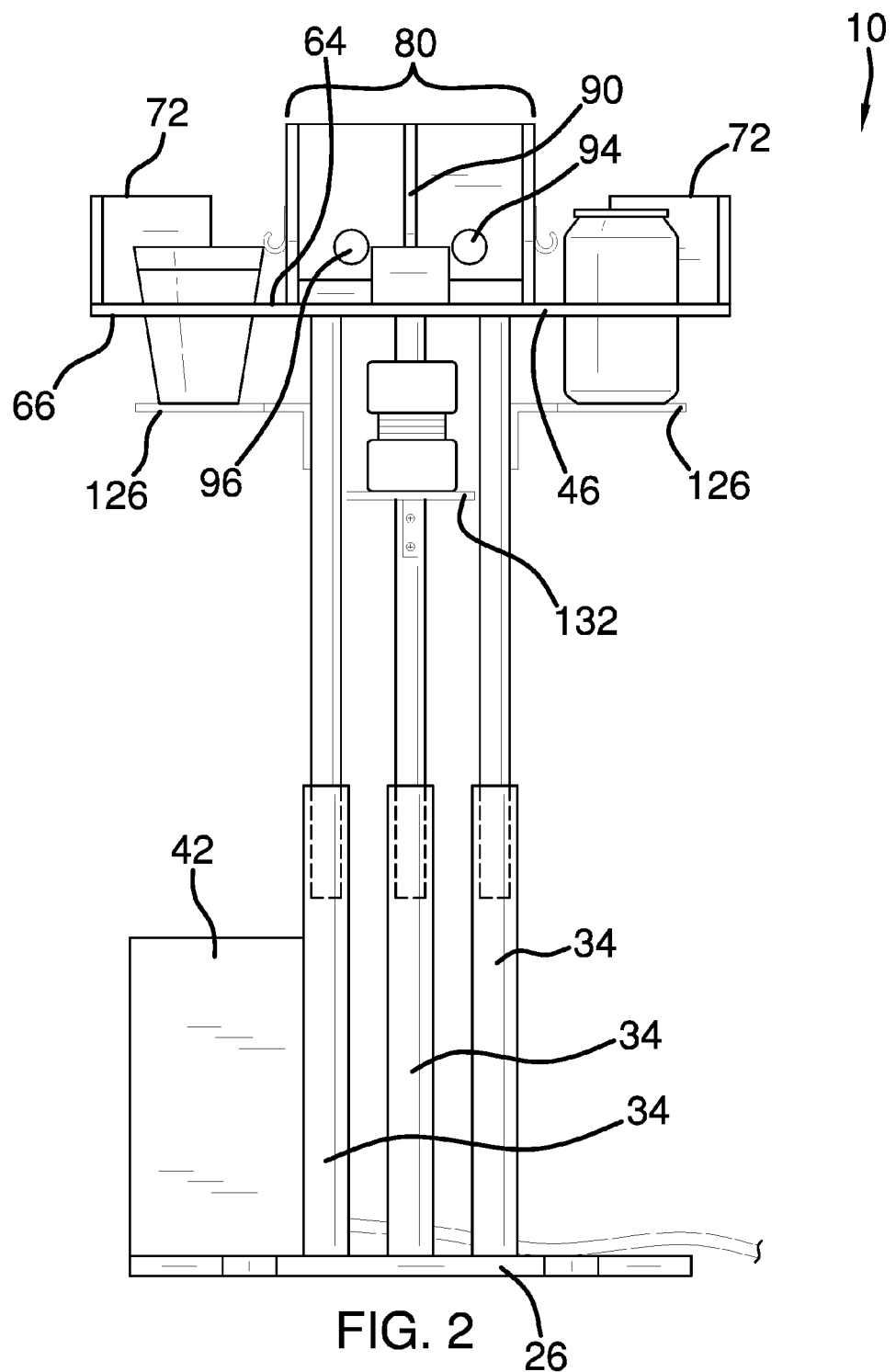
FIG. 2 is a front elevation view.
Figure 3:
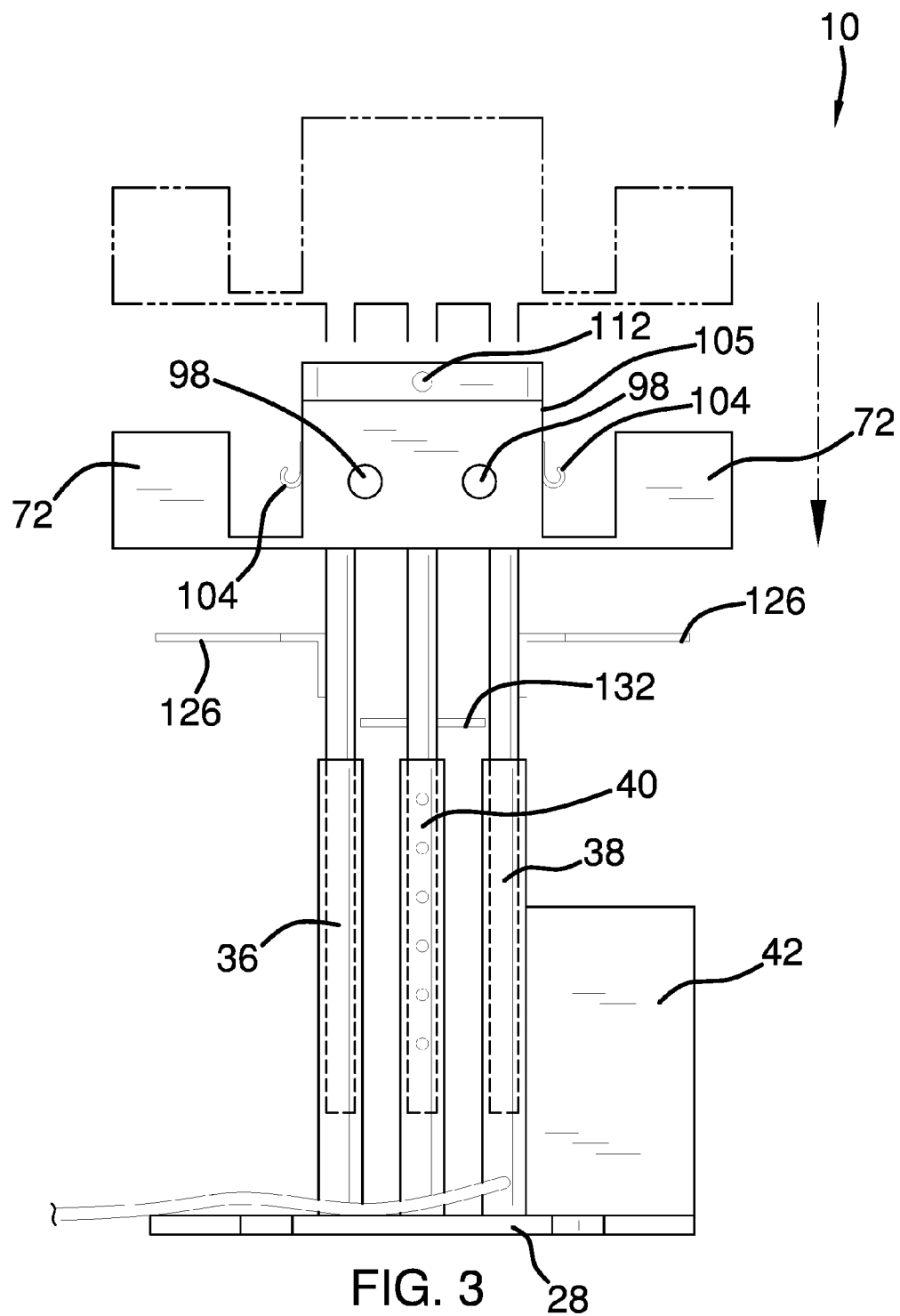
FIG. 3 is a rear elevation view.
Figure 4:
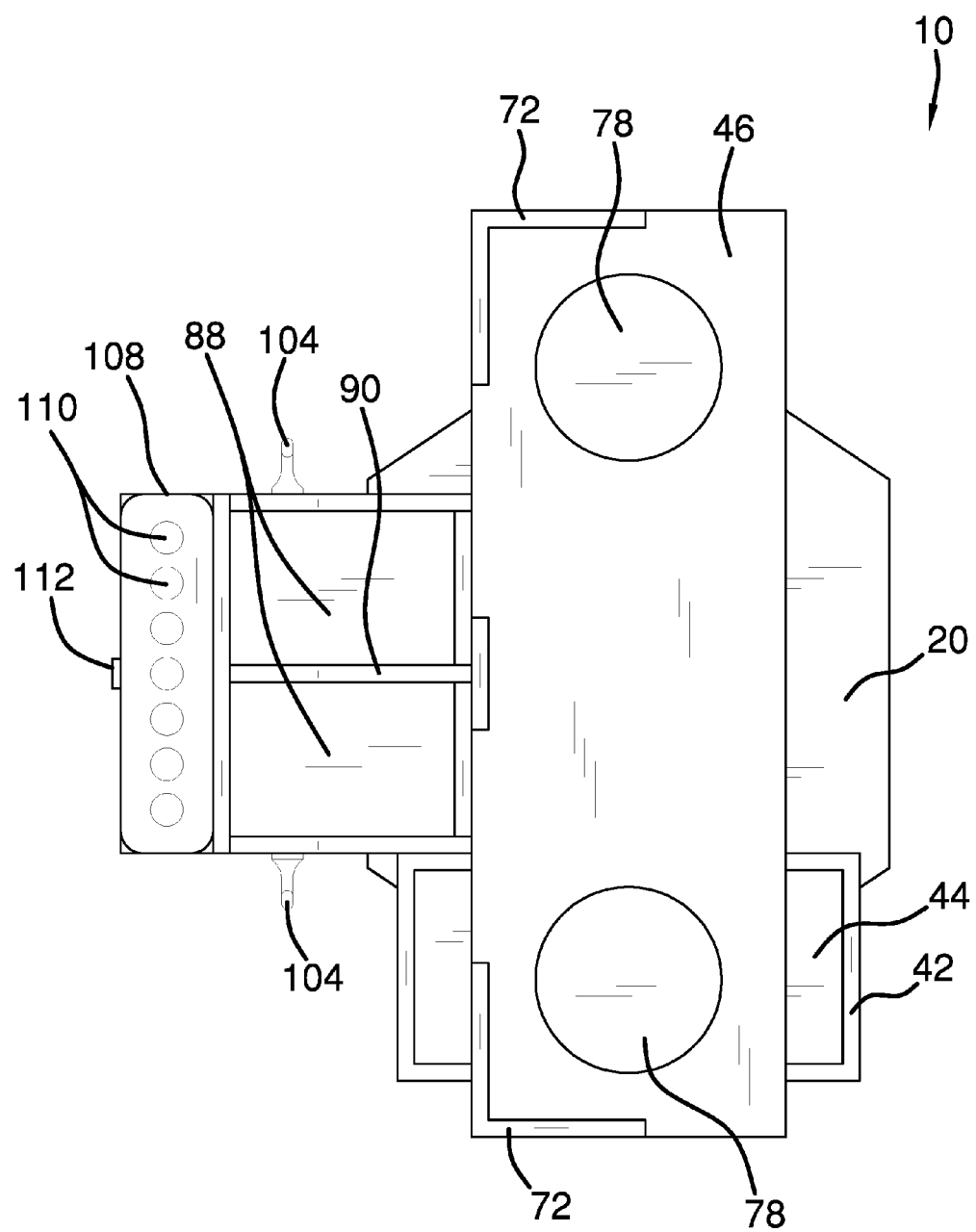
FIG. 4 is a top plan view.
Figure 5:
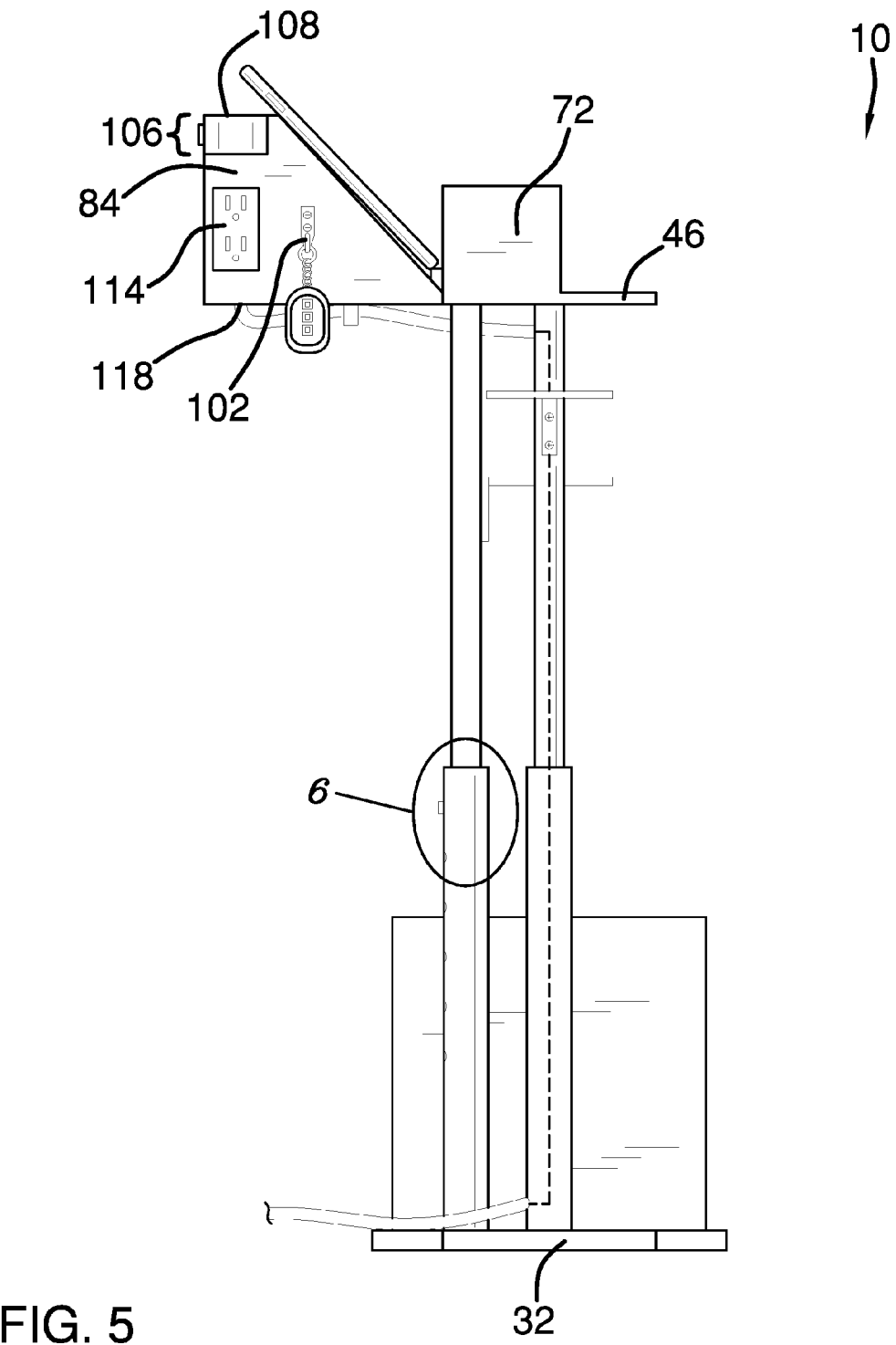
FIG. 5 is a side elevation view.
Figure 6:
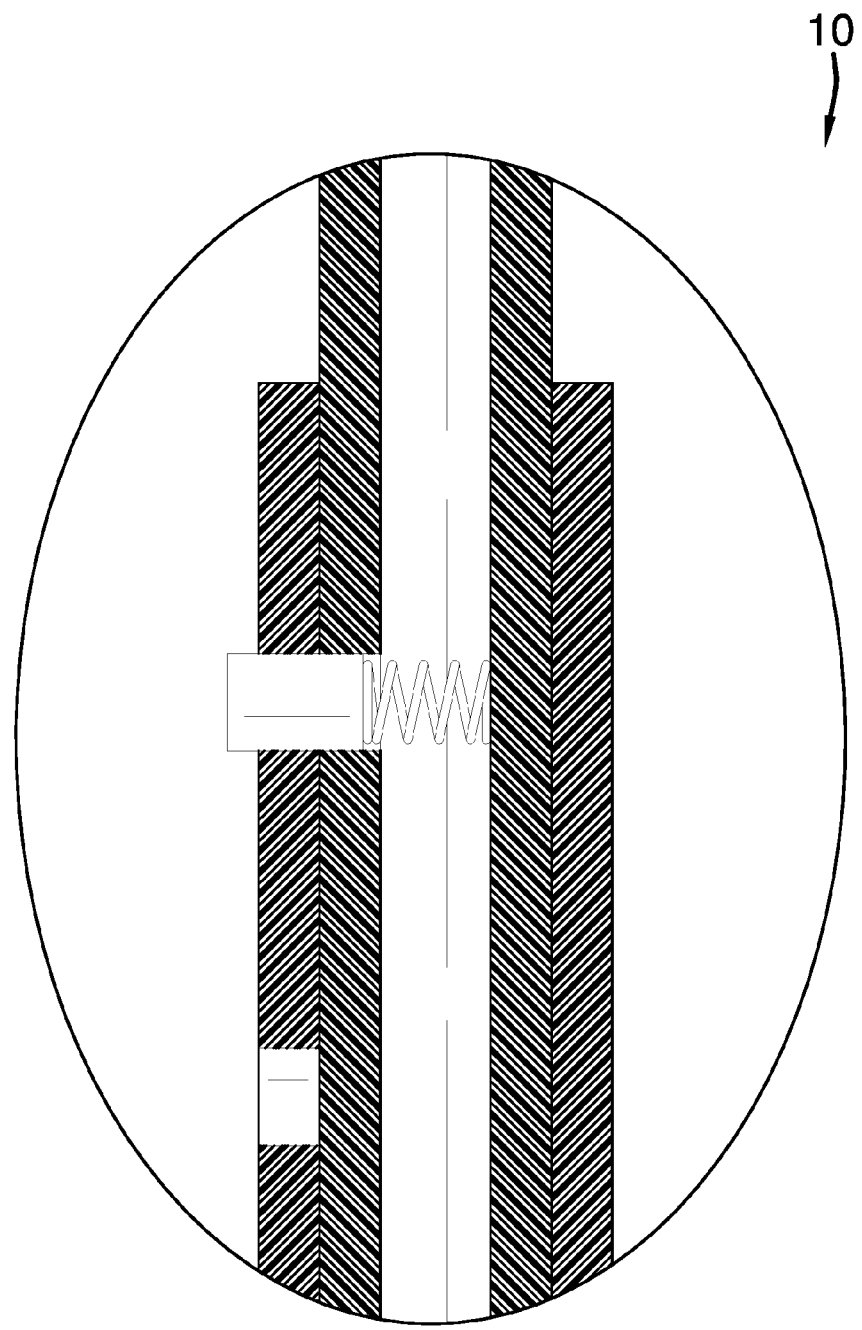
FIG. 6 is a detail view showing one of a plurality of vertically disposed cylindrical telescopic legs.

With reference now to the drawings, and in particular FIGS. 1 through 6 thereof, an example of the instant multipurpose lighting and entertainment stand employing the principles and concepts of the present multipurpose lighting and entertainment stand and generally designated by the reference number 10 will be described.

Referring to FIGS. 1 through 6 the present multipurpose lighting and entertainment stand 10 is illustrated. The multipurpose lighting and entertainment stand 10 includes a base unit 20 having a top side 22, a bottom side 24, a front side 26, a rear side 28, a right side 30, and a left side 32. A plurality of vertically disposed cylindrical telescopic legs 34 includes a front right leg 36, a front left leg 38, and a rear middle leg 40, with each of the front right leg 36, the front left leg 38, and the rear middle leg 40 disposed on the top side 22 of the base unit 20. Specifically, each of the front right leg 36 and the front left leg 38 is medially disposed on the top side 22 of the base unit 20 between the front side 26 and the rear side 28, and the rear middle leg 40 is medially disposed between the front right leg 36 and the front left leg 38 proximal the rear side 28. A trash can 42, optionally rectangular, is attached to the top side 22 of the base unit 20 proximal the left side 32. The trash can 42 has an open top end 44.

The multipurpose lighting and entertainment stand 10 further includes a horizontally disposed rectangular platform 46 medially disposed directly atop the plurality of vertically disposed cylindrical telescopic legs 34. The rectangular platform 46 has a front edge 48, a rear edge 50, a right edge 52, a left edge 54, a right front corner 56, a left front corner 58, a right rear corner 60, a left rear corner 62, a top surface 64, and a bottom surface 66. Each of a right support end 68 and a left support end 70 of a pair of vertically disposed L-shaped support ends 72 is disposed directly atop each the right rear corner 60 and the left rear corner 62, respectively, of the horizontally disposed rectangular platform 46, along a continuous outer edge of the horizontally disposed rectangular platform 46. Each of a right opening 74 and a left opening 76 of a pair of circular cup holder openings 78 is disposed through the horizontally disposed rectangular platform 46 proximal each of the right edge 52 and the left edge 54, respectively.

A pair of attached identical triangular compartments 80 is medially disposed on and extended rearward from the rear edge 50 of the horizontally disposed rectangular platform 46. The pair of attached identical triangular compartments 80 has a vertically disposed substantially triangular right wall 82, a vertically disposed substantially triangular left wall 84, a vertically disposed rear wall 86 disposed between the substantially triangular right wall 82 and the substantially triangular left wall 84, a horizontally disposed bottom wall 88, a vertically disposed middle divider wall 90 medially disposed between the substantially triangular right wall 82 and the substantially triangular left wall 84, and an upper ledge 92. Each of a right aperture 94 and a left aperture 96 of a pair of circular apertures 98 is disposed within the vertically disposed rear wall 86 of the pair of attached identical triangular compartments 80 proximal each of the vertically disposed substantially triangular right wall 82 and the vertically disposed substantially triangular left wall 84, respectively. Each of a right hook 100 and a left hook 102 of a pair of hooks 104 is attached to an external surface 105 of each of the vertically disposed substantially triangular right wall 82 and the vertically disposed substantially triangular left wall 84, respectively, of the pair of attached identical triangular compartments 80.

A rectangular lighting unit 106 is disposed on the upper ledge 92 of the pair of attached identical triangular compartments 80. The rectangular lighting unit 106 has an exterior housing 108, a plurality of upward facing light emitting diodes 110, and an activation control 112. A power outlet 114 is disposed on the vertically disposed substantially triangular left wall 84 of the pair of attached identical triangular compartments 80. A power cord 116 has a proximal end 118 attached to the power outlet 114 and a distal end 122 extended downward through one of the plurality of vertically disposed cylindrical telescopic legs 34 and removably attachable to a power source 124. The plurality of upward facing light emitting diodes 110 of the rectangular lighting unit 106, the activation control 112 of the rectangular lighting unit 106, the power outlet 120, and the power source 124 are in operational communication with each other.

Lastly, the multipurpose lighting and entertainment stand 10 includes a pair of disc-shaped cup holders 126 including a right cup holder 128 and a left cup holder 130. Each of the right cup holder 128 and the left cup holder 130 is attached to each of the front right leg 36 and the front left leg 38, respectively, of the plurality of vertically disposed cylindrical telescopic legs 34. Each of the right cup holder 128 and the left cup holder 130 is disposed underneath each of the right opening 74 and the left opening 76, respectively, of the pair of circular cup holder openings 78. A disc-shaped circular speaker holder 132 is attached to the rear middle leg 40 of the plurality of vertically disposed cylindrical telescopic legs 34. The disc-shaped circular speaker holder 132 is forwardly extended between each of the front right leg 36 and the front left leg 38 of the plurality of vertically disposed cylindrical telescopic legs 34.

What is claimed is:

1. A multipurpose lighting and entertainment stand comprising:
   a base unit having a top side, a bottom side, a front side, a rear side, a right side, and a left side;
   a plurality of vertically disposed cylindrical telescopic legs comprising a front right leg, a front left leg, and a rear middle leg, each of the front right leg, the front left leg, and the rear middle leg disposed on the top side of the base unit, wherein each of the front right leg and the front left leg is medially disposed on the top side of the base unit between the front side and the rear side, and the rear middle leg is medially disposed between the front right leg and the front left leg proximal the rear side;
   a trash can attached to the top side of the base unit proximal the left side, the trash can having an open top end;
   a horizontally disposed rectangular platform medially disposed directly atop the plurality of vertically disposed cylindrical telescopic legs, the horizontally disposed rectangular platform having a front edge, a rear edge, a right edge, a left edge, a right front corner, a left front corner, a right rear corner, a left rear corner, a top surface, and a bottom surface;
   a pair of vertically disposed L-shaped support ends comprising a right support end and a left support end, wherein each of the right support end and the left support end is disposed directly atop each the right rear corner and the left rear corner, respectively, of the horizontally disposed rectangular platform, along a continuous outer edge of the horizontally disposed rectangular platform;
   a pair of circular cup holder openings comprising a right opening and a left opening, each of the right opening and the left opening disposed through the horizontally disposed rectangular platform proximal each of the right edge and the left edge, respectively;
   a pair of attached identical triangular compartments medially disposed on and extended rearward from the rear edge of the horizontally disposed rectangular platform, the pair of attached identical triangular compartments having a vertically disposed substantially triangular right wall, a vertically disposed substantially triangular left wall, a vertically disposed rear wall disposed between the vertically disposed substantially triangular right wall and the vertically disposed substantially triangular left wall, a horizontally disposed bottom wall, a vertically disposed middle divider wall medially disposed between the substantially triangular right wall and the substantially triangular left wall, and an upper ledge;
   a pair of circular apertures comprising a right aperture and a left aperture, each of the right aperture and the left aperture disposed within the vertically disposed rear wall of the pair of attached identical triangular compartments proximal each of the vertically disposed substantially triangular right wall and the vertically disposed substantially triangular left wall, respectively;
   a rectangular lighting unit disposed on the upper ledge of the pair of attached identical triangular compartments, the rectangular lighting unit having an exterior housing, a plurality of upward facing light emitting diodes, and an activation control;
   a pair of hooks comprising a right hook and a left hook, each of the right hook and the left hook attached to an external surface of each of the vertically disposed substantially triangular right wall and the vertically disposed substantially triangular left wall, respectively, of the pair of attached identical triangular compartments;
   a power outlet disposed on the vertically disposed substantially triangular left wall of the pair of attached identical triangular compartments;
   a power cord having a proximal end attached to the power outlet and a distal end extended downward through one of the plurality of vertically disposed cylindrical telescopic legs and removably attachable to a power source;
   wherein the plurality of upward facing light emitting diodes of the rectangular lighting unit, the activation control of the rectangular lighting unit, the power outlet, and the power source are in operational communication with each other;
   a pair of disc-shaped cup holders comprising a right cup holder and a left cup holder, each of the right cup holder and the left cup holder attached to each of the front right leg and the front left leg, respectively, of the plurality of vertically disposed cylindrical telescopic legs, wherein each of the right cup holder and the left cup holder is disposed underneath each of the right opening and the left opening, respectively, of the pair of circular cup holder openings; and
   a disc-shaped circular speaker holder attached to the rear middle leg of the plurality of vertically disposed cylindrical telescopic legs, wherein the disc-shaped circular speaker holder is forwardly extended between each of the front right leg and the front left leg of the plurality of vertically disposed cylindrical telescopic legs.

2. The multipurpose lighting and entertainment stand of claim 1 wherein the trash can is rectangular.

* * * * *